Feb. 7, 1939.   H. L. DE LISLE   2,146,288
PENCIL POINTER OR THE LIKE
Filed March 3, 1937   2 Sheets-Sheet 1
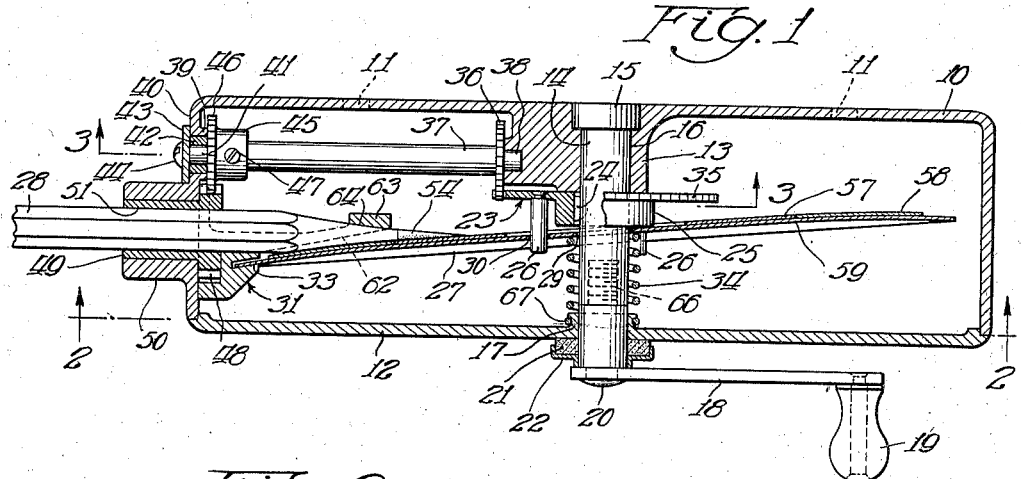
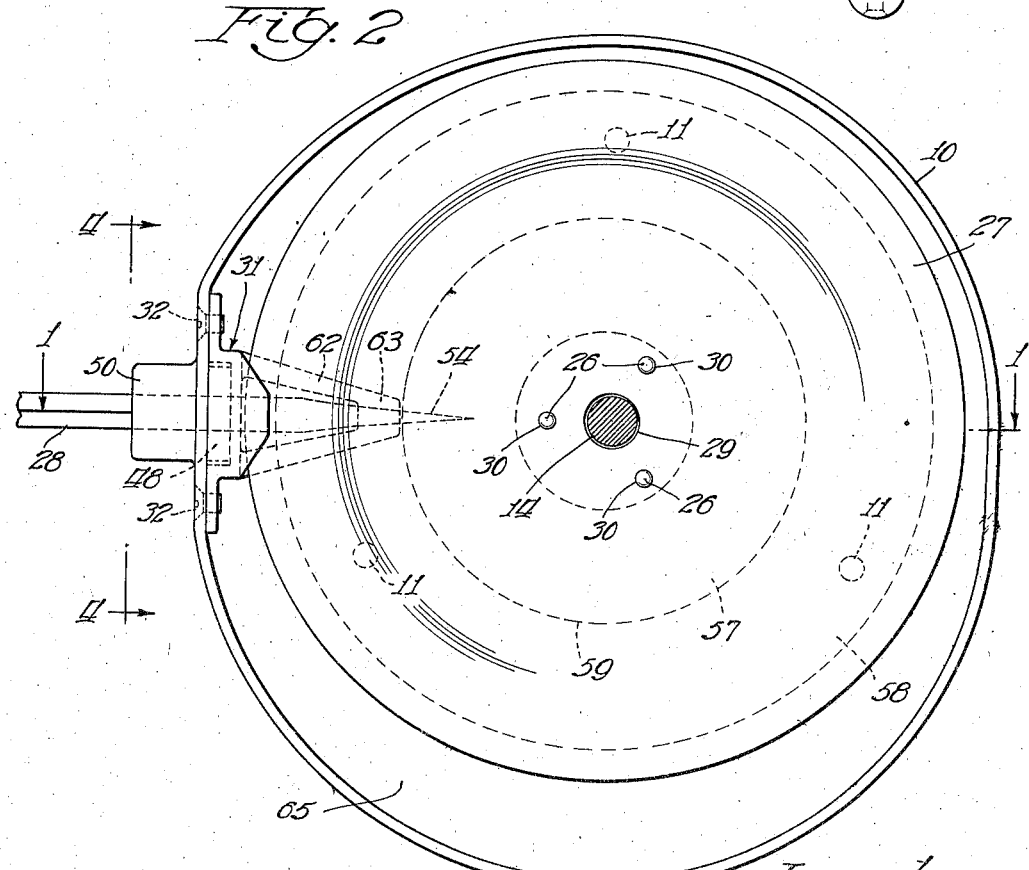
Inventor:
Harold L. DeLisle
By A. Trevor Jones
Atty Feb. 7, 1939.  H. L. DE LISLE  2,146,288
PENCIL POINTER OR THE LIKE
Filed March 3, 1937   2 Sheets-Sheet 2
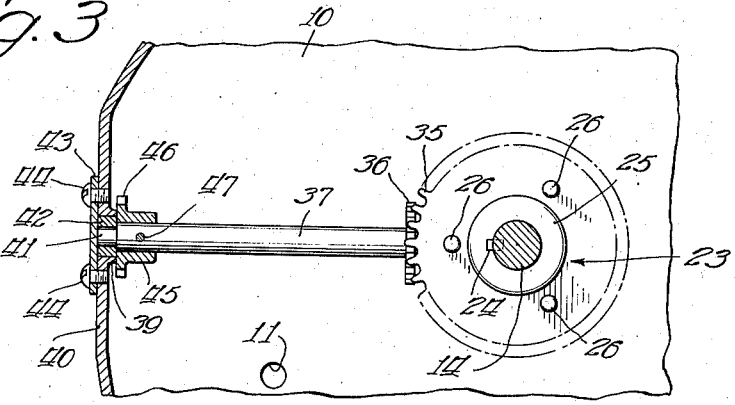
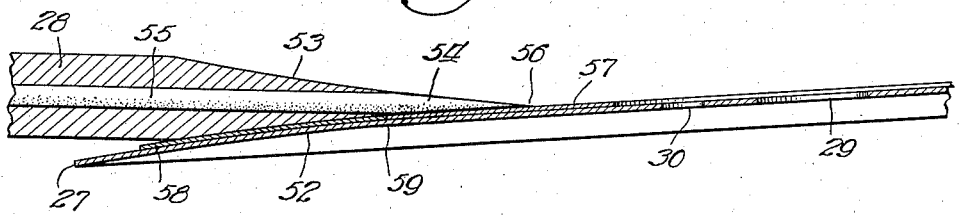
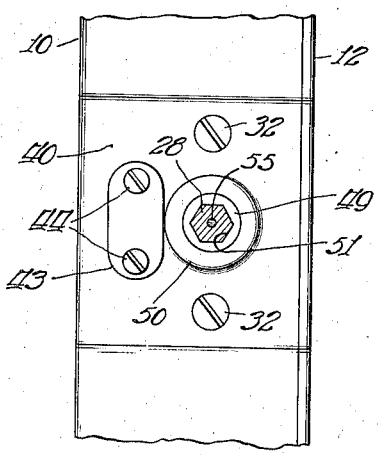
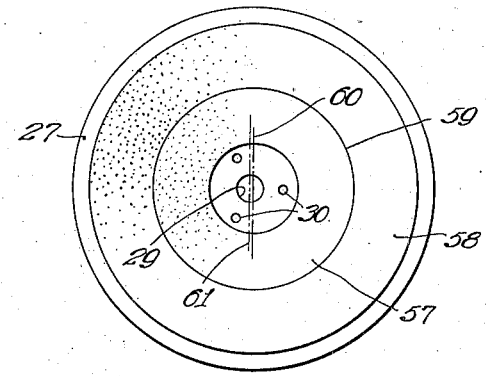
Inventor:
Harold L. DeLisle
By: A. Trevor Jones
Atty.

Patented Feb. 7, 1939

2,146,288

UNITED STATES PATENT OFFICE 2,146,288

PENCIL POINTER OR THE LIKE

Harold L. De Lisle, Two Rivers, Wis.

Application March 3, 1937, Serial No. 128,732

10 Claims. (Cl. 120—95)

This invention relates to a draftsman's pencil pointing device.

It is of special utility for use by mechanical draftsmen, engineers and the like for effecting an extremely long fine point on a drafting pencil and yet a point which has a minimum of susceptibility to breakage. The device is particularly a pencil pointer rather than a mere pencil sharpener, and is for producing a particular point on the pencil.

Among other objects, the invention aims to provide a simplified and compact device of this class which requires a reduced number of parts and a minimum of maintenance care and which is at the same time of enhanced efficiency and serviceability.

The novelty and utility of the invention will be readily understood by reference to the following description taken together with the accompanying drawings in which:—

Figure 1 is a cross-sectional view of a device embodying the present invention taken along the line 1—1 of Fig. 2;

Figure 2 is an elevational view of parts of the structure of Fig. 1 with cover-plate removed and being a section taken on the line 2—2 of Fig. 1;

Figure 3 is a fragmentary elevational view partly in section taken on the line 3—3 of Fig. 1;

Figure 4 is a fragmentary end elevation and being a section taken on the line 4—4 of Fig. 2;

Figure 5 is a reduced view of the abrasive disk of Figs. 1 and 2; and

Figure 6 is an enlarged cross-sectional view of a portion of the disk with the pencil associated therewith.

In the illustrative embodiment of the invention shown in the drawings, the casing 10, which may be conveniently formed by a die casting, is of somewhat shallow box-like form and may be mounted on a suitable support (not shown) such as a wall or a draftsman's desk, by screw holes 11. A cover plate 12 acts as a closure therefor as well as functioning in other respects later described. A somewhat central interior boss 13, which may be cast integrally with the casing, forms a bearing for a rotatable spindle 14. At its rear end the spindle may have a head 15 received in a counterbored portion of the bore 16 in which the spindle rotates, thus limiting forward movement of the spindle. At its forward end the spindle passes rotatively through a bearing portion 17 formed in the cover-plate 12 and a crank arm 18 and handle 19 are secured to the outwardly projecting end 20 of the spindle to form a crank therewith for causing rotation of the mechanism next described. In order to suitably space the crank arm 18 from the coverplate 12, a washer 21 of felt or resinous material protected by a flanged washer 22, may be disposed between the crank arm and the cover plate.

In accordance with the present invention, I have shown, in this instance, an arbor 23 keyed as at 24 on the spindle 14 adjacent the end of the casing bearing boss 13. The arbor 23 has a forwardly extending hub portion 25 and carries spaced about this hub portion a plurality of, desirably more than two, and, in this instance, three, uniformly spaced-apart pins 26, the centers of which define a circle concentric with the axis of the spindle 14.

The arbor 23 is adapted to carry and cause rotation, with the spindle 14, of an abrasive disk 27 for pointing the pencil 28. The disk 27, which is desirably of sheet metal, is centrally perforated as at 29 to receive the spindle 14 therethrough, and, about the perforation 29, has the holes 30 adapted to register with the pins 26 on the arbor 23. Thus the disk is keyed to rotate with the spindle and arbor, but, at the same time, may have some relative axial movement on the pins 26. Following the present invention, the disk 27 may therefore be tilted on its bearing to suit the angle of the pencil point, and for this purpose, I have shown a guide member 31 carried by the casing adjacent the place of entry of the pencil 28 and providing a guide for both the pencil point and the disk periphery. The member 31 may be secured to the casing 10 as by screws 32. In this instance, the member 31 has a groove 33 which receives, with a snug running fit, the peripheral margin of the disk 27 and thus causes the disk to be tilted outwardly in the vicinity of the guide member and thus in the vicinity of the pencil point. Resilient means, such as the compression coil spring 34, concentric with the spindle 14 and disposed between the cover-plate 12 and the disk 27, yieldingly urges the disk on the pins 26 against the arbor hub 25, where the disk is not tilted by the guide member 31. Since the pins 26 are longer than the hub 25, the disk may be rotated in its tilted position, slight axial movement of the disk on the pins 26 under the yielding restraint of the spring 34 being permitted. The disk, although rotated directly by the crank, turns on an axis oblique thereto, thus effecting a saving in space while permitting the pencil to be inserted perpendicularly to the crank.

In order to effect rotation of the pencil 28 simultaneously with the rotation of the disk, the usual gear train is provided, which may include, in this instance, mating spur gears 35 and 36 carried respectively by the arbor 23 and one end of a shaft 37. The shaft 37 at this end may have a bearing 38 in the casing boss 13 and at its other end a bearing 39 in the casing wall 40 adjacent the place of entry of the pencil 28. In order to assemble the shaft 37 with the casing, the bearing 39 may be sufficiently larger than the shaft journal 41 so that the shaft may be maneuvered into position, the bushing 42 placed in the bearing 39, a retaining plate 43 placed over the end of the shaft, and the screws 44 (Fig. 4) securing the assembly. The collar 45 carrying a spur gear 46 may be moved on the shaft 37 and keyed thereto by a set screw 47 in position to mesh with a gear 48 formed integrally with a sleeve 49 rotatable in a bearing 50 which may be formed integrally with the casing end 40. Axial movement of the sleeve 49 and gear 48 is restrained by the guide member 31 which fits over these parts within the casing while permitting their rotation. As shown in Fig. 4, the sleeve 49 has a bore 51 which is of hexagonal cross-section to snugly receive and provide a holder for the pencil 38, which, as commonly used by draftsmen, is of hexagonal cross-section. Thus by reason of the fact that the gear 35 is larger than the gear 36, rotation of the pencil simultaneously with rotation of the disk 27 occurs at enhanced speed for the pencil.

It will be understood that the primary purpose of the present device is not to sharpen the pencil initially but to give it an improved point for drafting use. Consequently, if the pencil be broken or entirely unpointed, it should be first cut by a hand knife or on a conventional pencil-sharpening machine before it is operated upon by my device.

An optimum point for a draftsman's pencil is one in which the exposed lead is relatively long so that a gradually tapering point may be given thereto. This results in minimizing the change in the sharpness and character of the point as the draftsman uses it. It is impossible to produce such a desired point on the pencil, however, by the conventional pencil-sharpening machine or by manual cutting, for one reason that if the point is made as long as desirable, it will either not be sufficiently finely tapered or will be subject to easy breakage. I have found that by producing a particular contour of point on the pencil, the desired results may be accomplished and the difficulties avoided, and that this may be done by moulding, so to speak, the abrasive face of the disk 27 predeterminably to suit the contour of pencil point desired. Thus, as best shown in the enlarged fragmentary cross-section of Fig. 6, the disk 27 is somewhat dished as at 52 to produce a concave point 53 on the pencil. This results in exposing a greater portion 54 of the pencil lead 55 and thus permitting a longer and finer taper of the exposed lead 54 down to a fine point 56.

In order to provide abrasive contact areas of different degrees of fineness on the face of the disk 27, one to engage the wood of the pencil as at 53 and the other the lead of the pencil as at 54, I provide concentric annuli 57, 58 of sandpaper, or other hard abrasive material, the inner one 57 being of finer material to engage the lead and the outer being of coarser material to more quickly abrade the wood.

As the meeting line 59 of these two annuli is likely to cause an objectionable ridge or shoulder on the pencil point, I have provided means for preventing this and which contemplates offsetting the center of the annuli 57, 58 with respect to the axis of rotation of the disk 27. This may be done by placing the annuli off-center on the disk 27, but in this instance I have shown the central perforation 29 of the disk off-center with respect to the center of the disk and annuli. Thus, as shown in Fig. 5, the center of the disk is in a plane 60, whereas the center of the perforation 29 and pin holes 30 is in an offset plane 61. Thus when the disk is placed on the spindle the center of the perforation 29 of course coincides with the axis of rotation of the spindle, but the center of the disk revolves thereabout, which causes the circle 59 which is concentric with the center of the disk to move back and forth on the pencil point, thus avoiding a mark being formed thereby. Figures 1 and 2 show the disk at the extreme of its lateral movement toward the left, the groove 33 being deep enough to permit the periphery of the disk to move in and out with respect thereto, to accommodate this slight lateral movement.

In order to support the pencil point at its side opposite the disk 27, I desirably provide a pencil guide 62 which may be in the form of a bracket integral with the guide member 31, this pencil guide having a somewhat semi-cylindrical extremity 63 which forms both a support and a stop for the pencil and is desirably tapered on its inner face, where it engages the pencil as at 64, to correspond somewhat with the taper of the pencil. The stop thus provided also somewhat limits the extent of insertion of the pencil to avoid too long a point being produced thereon.

The casing is desirably somewhat elongated at its bottom end as at 65 where dust and dirt may be collected to be later removed at intervals. To permit access to the interior of the casing, and if desired to the screws which mount the casing through the screw holes 11, the spindle 14 is formed of screw-threaded sections mating as at 66. By giving the crank arm 18 a sudden counter-clockwise movement, the spindle sections may be screwed apart to remove the cover plate 12. The disk 27 will then drop away from its bearing on the arbor 23 to which it has been held by the spring 34. The end of the spring 34 abutting the cover plate is desirably anchored thereto as at 67 so as to come away with the cover plate. It will be noted that normal rotation of the crank arm and disk is intended to be clockwise.

Manifestly, the invention is not limited to the details of construction shown for purposes of illustration. Furthermore, it is not indispensable that all features of the invention be used conjointly, as various combinations or sub-combinations may be advantageously employed.

Having described my invention, I claim:

1. A pencil pointing device of the class described including a rotatable disk having on its face concentric annuli of abrasive material of different fineness, said annuli being off-center with respect to the center of rotation of said disk.

2. A pencil pointing device of the class described comprising a rotatable disk having a bearing aperture adjacent its center, a spindle slidably received in said aperture, means including perforations in the disk and pins keyed to rotate with the spindle slidably received in said perforations causing rotation of the disk with the spindle but permitting relative axial movement of the disk and spindle, peripheral means guidingly receiving the margin of the disk for tilting the disk with respect to the axis of the spindle, stop means limiting axial movement of the disk in one direction, and resilient means pressing the disk against said stop means but permitting said tilting under the influence of the peripheral means, and means for holding a pencil point in contact with said disk.

3. A pencil pointing device of the class described comprising a rotatable disk having a bearing aperture adjacent its center, a spindle loosely received in said aperture, means including slidably engaging parts on the disk and spindle causing rotation of the disk with the spindle but permitting relative axial movement of the disk and spindle, peripheral guide means tilting the disk with respect to the axis of the spindle, stop means limiting axial movement of the disk in one direction, and resilient means pressing the disk against said stop means but permitting said tilting, said peripheral guide means also assisting to limit said axial movement, and means for holding a pencil in contact with said disk.

4. A pencil pointing device of the class described including a rotatable disk, a spindle passing therethrough, means causing rotation of the spindle to effect rotation of the disk, means causing limited tilting axial movement of the disk on the spindle, and pencil receiving means axially perpendicular to said spindle and adjacent the periphery of said disk.

5. A pencil pointing device of the class described comprising a casing, a rotatable spindle therein, an arbor keyed to the spindle concentric therewith, a disk journaled on said spindle and connected with said arbor, means causing rotation of the spindle to cause rotation of the disk, and additional means for tilting the disk into an oblique plane fixed with respect to the casing.

6. A pencil pointing device of the class described including a relatively narrow casing, a spindle rotatable in said casing on an axis normal to the length of the casing, an arbor co-axial and rotatable with the spindle, a disk having a central aperture through which the spindle loosely passes and at least three smaller apertures spaced thereabout, pins on the arbor passing through said smaller apertures but permitting axial movement of the disk with respect to the pins and spindle, a member carried by the casing adjacent the periphery of said disk and against which the said periphery frictionally rests, said member being positioned to tilt the disk on said arbor, and a compression coil spring concentric with the spindle and pressing the disk against the arbor at the side remote from said member, and pencil receiving means axially perpendicular to said spindle.

7. The structure of claim 6 wherein the member is grooved and the edge of the disk rides in said groove.

8. The structure of claim 6 wherein the arbor has a central hub against which the disk is pressed at the side remote from said member.

9. A pencil pointing device of the class described including a relatively narrow casing, a spindle rotatable in said casing on an axis normal to the length of the casing, an arbor co-axial and rotatable with the spindle, a disk having a central aperture through which the spindle loosely passes and at least three smaller apertures spaced thereabout, pins on the arbor passing through said smaller apertures but permitting axial movement of the disk with respect to the pins and spindle, a member carried by the casing adjacent the periphery of said disk and against which the said periphery frictionally rests, said member being positioned to tilt the disk on said arbor, a compression coil spring concentric with the spindle and pressing the disk against the arbor at the side remote from said member, and a pencil holder carried by the casing on an axis perpendicular to the spindle and adjacent said member whereby a pencil point may be pressed against the tilted face of the disk.

10. The structure of claim 9 wherein a gear train is provided for causing rotation of the pencil holder simultaneously with rotation of the disk.

HAROLD L. DE LISLE.